Jan. 5, 1926.  
C. McNAIR  
1,568,898  
REFRIGERATING APPARATUS  
Filed Feb. 18, 1925   2 Sheets-Sheet 2
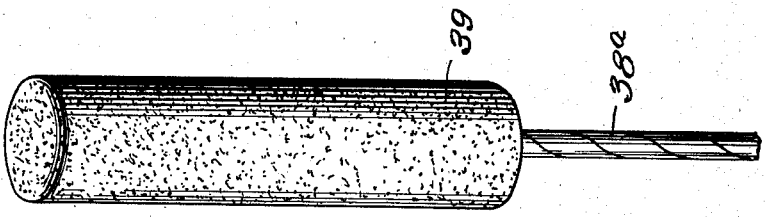
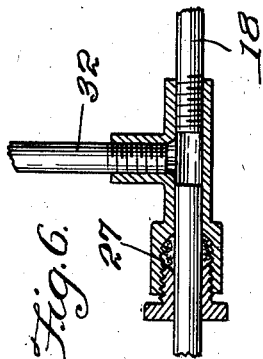
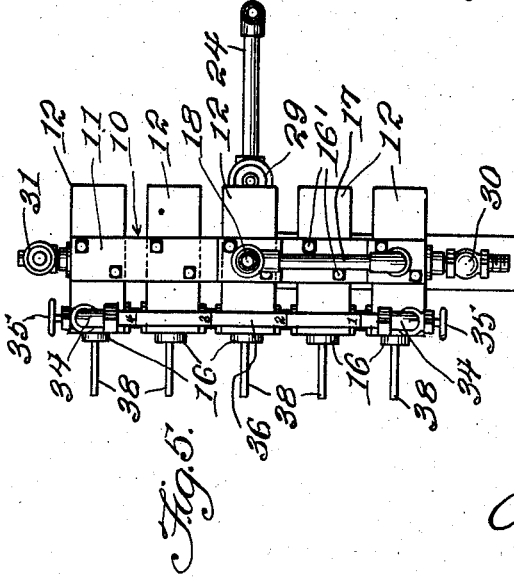

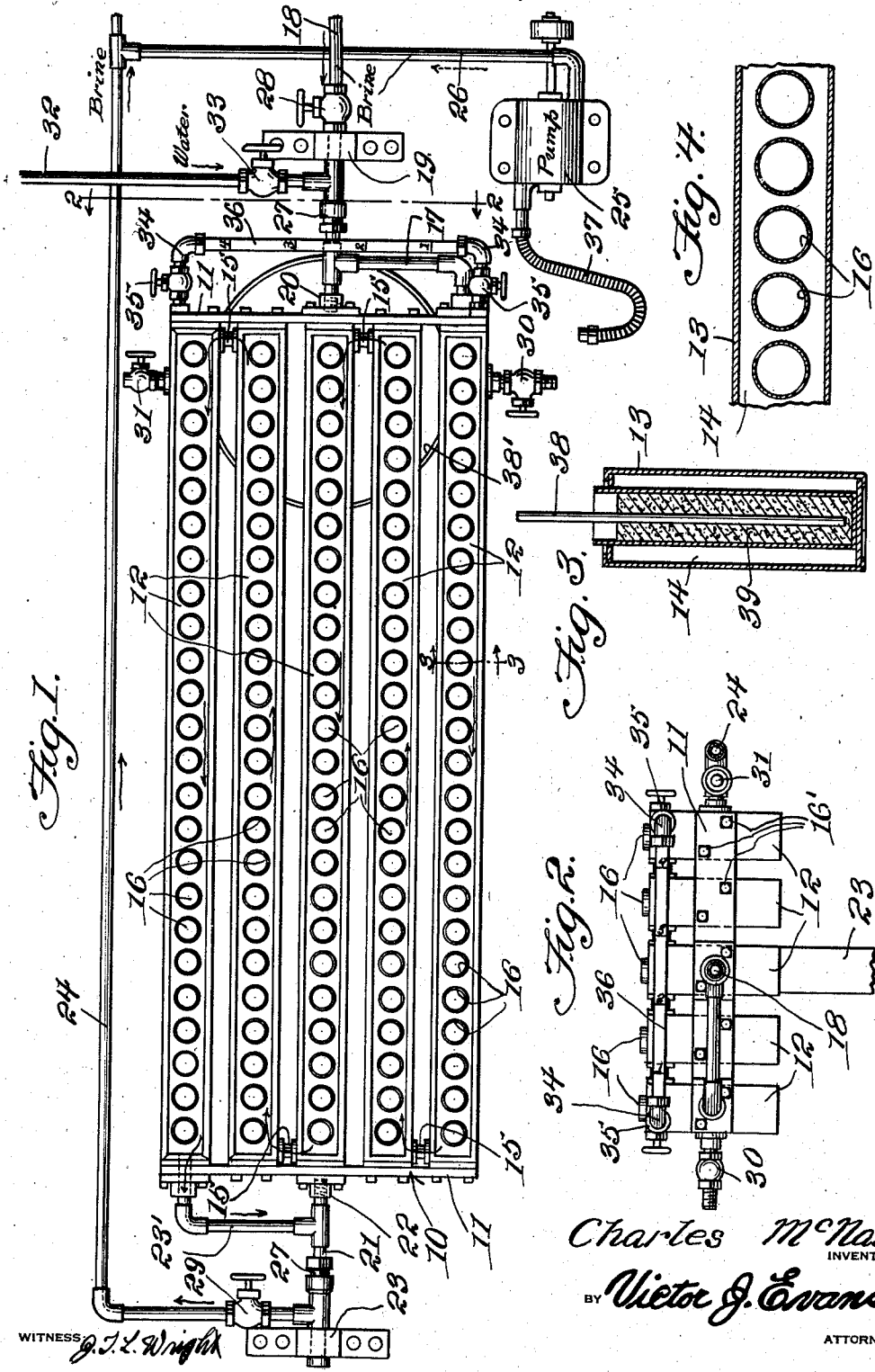

Patented Jan. 5, 1926.

1,568,898

UNITED STATES PATENT OFFICE.

CHARLES McNAIR, OF JACKSON, MISSISSIPPI, ASSIGNOR, BY DIRECT AND MESNE ASSIGNMENTS, TO THE HAWMACK MANUFACTURING COMPANY, OF JACKSON, MISSISSIPPI.

REFRIGERATING APPARATUS.

Application filed February 18, 1925. Serial No. 10,113.

*To all whom it may concern:*

Be it known that I, CHARLES MCNAIR, a citizen of the United States, residing at Jackson, in the county of Hinds and State of Mississippi, have invented new and useful Improvements in Refrigerating Apparatus, of which the following is a specification.

This invention relates to refrigerating apparatus and has especial relation to means for making frozen confections, an object being to provide an apparatus in which a confection may be frozen upon a stick-like handle.

To this end, the invention aims to provide an apparatus within which the confection may be conveniently placed and readily frozen, means being provided for releasing the frozen confection so that it may be removed intact for controlling the releasing means to prevent the confection from melting.

With the above and other objects in view, the invention further includes the following novel features and details of construction, to be hereinafter more fully described, illustrated in the accompanying drawings and pointed out in the appended claims.

In the drawings:—

Figure 1 is a top plan view of a refrigerating apparatus constructed in accordance with the invention.

Figure 2 is a section on the line 2—2 of Figure 1.

Figure 3 is an enlarged section on the line 3—3 of Figure 1.

Figure 4 is a fragmentary horizontal section taken through one of the freezing compartments and showing a number of the containers.

Figure 5 is an end view partly broken away showing the apparatus in position for the removal of the frozen confection.

Figure 6 is an enlarged fragmentary sectional view showing the connection between the brine and water supply pipes.

Figure 7 is an enlarged fragmentary section illustrating the manner of removably mounting the freezing units.

Figure 8 is an enlarged perspective view of the frozen confection.

Figure 9 is a fragmentary sectional view of another type of confection.

Figure 10 is a similar view showing a portion of the confection illustrated in Figure 8.

Referring to the drawings in detail wherein like characters of reference denote corresponding parts, the reference character 10 indicates a casing which includes end members or heads 11 which are connected by independent freezing units 12. The units 12 are removably secured between the heads 11 by any suitable means and each unit comprises a vertically disposed elongated casing 13, closed to provide a freezing compartment 14. At each end, the units 12 are provided with spacing blocks 15' which receive screws or bolts 16' extending through the head 11. The freezing compartments 14 of the units 12 are in communication with one another through nipples 15 so as to provide for a circulation through the compartments. Each freezing unit 12 further includes a plurality of containers 16 which are shown as cylindrical. Normally the casing 10 is so positioned that the freezing compartments 14 will be arranged in horizontal spaced relation while the containers are vertically disposed and are open at the top as shown in Figure 3 of the drawings. Extending through one of the heads 11 and communicating with one end of one of the freezing compartments 14 is a pipe 17. This pipe communicates with a pipe 18 which extends to a suitable supply of brine or other freezing solution. The pipe 18 is mounted in a suitable bearing indicated at 19 and its inner end extends within a bearing 20 secured to one of the heads 11 so as to provide a pivotal mounting for one end of the casing. A pipe 21 extends from the opposite end of the casing and has its inner end disposed within a bearing 22 carried by the adjacent head 11, while the pipe 21 also is mounted within a bearing 23 so that a pivotal support is provided for this end of the casing. The casing may thus be moved so as to dispose the freezing compartments in vertical spaced relation with the containers horizontally arranged. The pipe 21 is in communication with one end of one of the freezing compartments by means of a pipe 23', while also extending from the pipe 21 is a pipe 24 which may lead to the brine supply and which may be in communication with a pump 25 by means of a pipe 26. The pipes 18 and 21 are provided with suitable packing glands 27 so that the inner sections of these pipes may rotate with the casing and a leak-proof joint be provided. The pipes 18 and 24 are provided with controlling valves 28 and 29 respectively. The outer freezing units 12 are provided with discharge and vent cocks 30 and 31 respectively. A water supply pipe 32 communicates with the pipe 18 and is provided with a controlling valve 33.

The outer freezing units 12 are in communication with one another at one end of the casing by means of a substantially U-shaped pipe 34, the latter being provided with valves 35 between which is a graduated transparent section 36 so as to provide a gauge or indicator. The pump 25 is provided with a flexible pipe or hose 37 which may be detachably connected to the drain cock 30.

The containers 16 are filled with the confection to be frozen, after which the valves 28 and 29 are opened so as to permit the brine to flow through the freezing compartments 14. When the contents of the containers begin to freeze, a stick-like handle 38 is inserted within the confection 39 as shown in Figure 3 of the drawings, the bottom of the confection being sufficiently stiff to prevent the stick 38 from moving upward due to the difference in specific gravity. After the freezing operation, the hose 37 may be connected to the drain cock 30, and the pump operated to suck the brine from the freezing compartments and force the same outward through the pipes 26 and 24 back to the source of supply, the vent cock 31 being opened to prevent the formation of a vacuum. If desired, the casing may be moved pivotally to the position shown in Figure 5 of the drawings so that the freezing units are vertically spaced and the brine permitted to drain into a receptacle 38' located beneath the casing. After the brine has been removed from the freezing compartments, the cocks 30 and 31 are closed and the cock 33 opened so as to permit water to flow into the freezing compartments around the containers for the purpose of forming the frozen confection, whereby the latter may be removed. To prevent undue melting or softening of the confection, the water is introduced to the freezing units successively or one at a time. For this purpose the indicator 36 is graduated in accordance with the height of the respective freezing units when the latter are vertically spaced and as soon as water reaches the first graduation upon the transparent pipe 36, the valve 33 is closed and the contents of the containers of the lowermost unit are removed. The valve 33 is then opened and water permitted to enter the next succeeding freezing unit and the contents of this unit removed and so on until the contents of the entire apparatus have been removed.

The stick-like handle may consist of a candy or other stick as indicated at 38ª in Figures 8 and 10 of the drawings, or it may consist of a wire or other handle 39 which is covered by a paper or other cover 40 as shown in Figure 9 of the drawings.

The invention is susceptible of various changes in its form, proportions and minor details of construction and the right is herein reserved to make such changes as properly fall within the scope of the appended claims.

Having described the invention what is claimed is:—

1. A machine for making frozen confections comprising a casing, a plurality of horizontally spaced normally vertically disposed communicating freezing compartments included in the casing, separate normally vertically disposed containers within each of the compartments, means to introduce a freezing solution into the freezing compartments to act upon the contents of the containers, means to permit of rotation of the casing to dispose the freezing compartments in vertically spaced relation and facilitate draining, means to successively introduce a softening liquid into the freezing compartments to release the contents of the containers and means to indicate introduction of the softening liquid within each of the compartments.

2. A machine for making frozen confections comprising end members, a plurality of horizontally spaced separate freezing units removably secured between the end members, each unit comprising a vertically disposed elongated freezing compartment and separate containers within each compartment, means providing communication between the compartments, means to introduce a freezing solution within the compartments to act upon the contents of the containers, means for pivotally supporting the casing to position the freezing compartments in vertically spaced relation, means to successively supply a softening liquid to the freezing compartments to release the contents of the containers and means to indicate the introduction of the softening liquid within each of the compartments.

In testimony whereof I affix my signature.

CHARLES McNAIR.